United States Patent
Chen et al.

(10) Patent No.: US 8,837,878 B2
(45) Date of Patent: Sep. 16, 2014

(54) MULTI-CORE OPTICAL FIBER COUPLER

(75) Inventors: Long Chen, North Brunswick, NJ (US); Po Dong, Morganville, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 347 days.

(21) Appl. No.: 13/216,790

(22) Filed: Aug. 24, 2011

(65) Prior Publication Data

US 2013/0051729 A1 Feb. 28, 2013

(51) Int. Cl.
| | |
|---|---|
| *G02B 6/26* | (2006.01) |
| *G02B 6/30* | (2006.01) |
| *B29D 11/00* | (2006.01) |
| *G02B 6/02* | (2006.01) |
| *G02B 6/12* | (2006.01) |
| *G02B 6/42* | (2006.01) |

(52) U.S. Cl.
CPC .............. *G02B 6/30* (2013.01); *G02B 6/02042* (2013.01); *G02B 2006/12104* (2013.01); *G02B 6/4214* (2013.01)
USPC .................. 385/32; 385/49; 385/126; 216/24

(58) Field of Classification Search
USPC ............... 385/31–32, 49, 50, 52, 88–89, 123, 385/125, 126; 216/24; 29/428
See application file for complete search history.

(56) References Cited

U.S. PATENT DOCUMENTS

| | | | |
|---|---|---|---|
| 2005/0063642 | A1 | 3/2005 | Gallup et al. |
| 2005/0185892 | A1* | 8/2005 | Kwon et al. ................... 385/49 |
| 2009/0010590 | A1* | 1/2009 | Krishnamoorthy et al. .... 385/14 |
| 2009/0180734 | A1* | 7/2009 | Fiorentino et al. ............. 385/31 |
| 2011/0129231 | A1 | 6/2011 | Fiorentino et al. |
| 2011/0274425 | A1 | 11/2011 | Grobe |
| 2011/0274435 | A1 | 11/2011 | Fini et al. |

FOREIGN PATENT DOCUMENTS

WO        2011093895 A1    8/2011

* cited by examiner

*Primary Examiner* — Uyen Chau N Le
*Assistant Examiner* — Michael Mooney
(74) *Attorney, Agent, or Firm* — Hitt Gaines, PC

(57) ABSTRACT

An optical device comprising a multi-core optical fiber coupler. The multi-core optical fiber coupler includes a substrate having a planar surface and turning mirrors located along the planar surface, each of the turning mirrors having a reflective surface oriented to change a direction of light between a direction that is parallel to the planar surface and a direction that is substantially non-parallel to the planar surface. The turning mirrors form a lateral pattern along the planar surface, the lateral pattern being configured to approximately match a pattern of optical cores in a multi-core optical fiber whose end segment faces the pattern and is positioned substantially normal to the planar surface of the substrate.

18 Claims, 5 Drawing Sheets

US 8,837,878 B2

MULTI-CORE OPTICAL FIBER COUPLER

TECHNICAL FIELD OF THE INVENTION

The present invention is directed, in general, to an optical devices and methods for manufacturing the same.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Multi-core optical fibers have multiple optical cores that are embedded in a single optical cladding medium. Multi-core optical fibers are emerging as a new transmission medium to increase the bandwidth capacity in optical fiber communication systems.

SUMMARY

One embodiment includes an optical device, comprising a multi-core optical fiber coupler. The multi-core optical fiber coupler includes a substrate having a planar surface and turning mirrors located along the planar surface, each of the turning mirrors having a reflective surface oriented to change a direction of light between a direction that is parallel to the planar surface and a direction that is substantially non-parallel to the planar surface. The turning mirrors form a lateral pattern along the planar surface, the lateral pattern being configured to approximately match a pattern of optical cores in a multi-core optical fiber whose end segment faces the pattern and is positioned substantially normal to the planar surface of the substrate.

In some embodiments, the non-parallel direction is parallel to a normal to the planar surface to within 20 degrees and is directed away from the substrate. In some embodiments, the non-parallel direction is parallel to a normal to planar surface to within 20 degrees and is directed into the substrate. In some embodiments, the pattern formed by the turning mirrors is a grid or hexagonal pattern of the turning mirrors orientated along two perpendicular axes that are parallel to the planar surface.

In some embodiments, the pattern formed by the turning mirrors includes adjacent pairs of the turning mirrors that are spaced apart by about a same distance. In some embodiments, the turning mirrors are a continuous part of a material layer of the substrate. In some embodiments, each reflective surface includes a reflective mirror-coating layer. Some embodiments further include a plurality of waveguides, wherein one end of each of the waveguides faces and is adjacent to the reflective surface of a corresponding one of the turning mirrors. In some embodiments, the plurality of waveguides are located on the planar surface of the substrate. In some embodiments, each of the waveguides has a corresponding planar optical core.

Another embodiment is a method comprising fabricating a multi-core optical fiber coupler. Fabricating the multi-core optical fiber coupler includes providing a substrate having a planar surface. Fabricating the multi-core optical fiber coupler includes locating turning mirrors on the planar surface, each of the turning mirrors having a reflective surface that is capable of changing a direction of light between a direction that is parallel to the planar surface and a direction that is substantially normal to the planar surface. The turning mirrors form a pattern along the planar surface, the pattern configured to match a lateral pattern of optical cores in a multi-core optical fiber having an end facing the pattern of the turning mirrors and having a near by end segment oriented substantially normal to the planar surface of the substrate.

In some embodiments, locating the turning mirrors including forming the turning mirrors from a material layer of the substrate. In some embodiments, forming the turning mirrors from the material layer includes etching the material layer. In some embodiments, the etching stops at an etch-stop layer of the substrate that is located below the material layer. Some embodiments further include optically coupling one end of each of a plurality of waveguides to the reflective surface of a distinct one of the turning mirrors, wherein the optically coupling further includes aligning a second substrate having the plurality of waveguides located thereon with the substrate such that each of the waveguides has an end facing and optically coupled to a corresponding adjacent one of the turning mirrors. Some embodiments further include orienting the multi-core optical fiber substantially normal to the planar surface such that each optical fiber core of the multi-core optical fiber is aligned with one reflective surface of the mirrors.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

DETAILED DESCRIPTION

The description and drawings merely illustrate the examples of embodiments. It will thus be appreciated that those skilled in the art will be able to devise various arrangements that, although not explicitly described or shown herein, embody principles of the inventions and are included within their scope. Furthermore, all examples recited herein are principally intended expressly to be only for pedagogical purposes to aid the reader in understanding the principles of the inventions and the concepts contributed by the inventor(s) to furthering the arts, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1A:
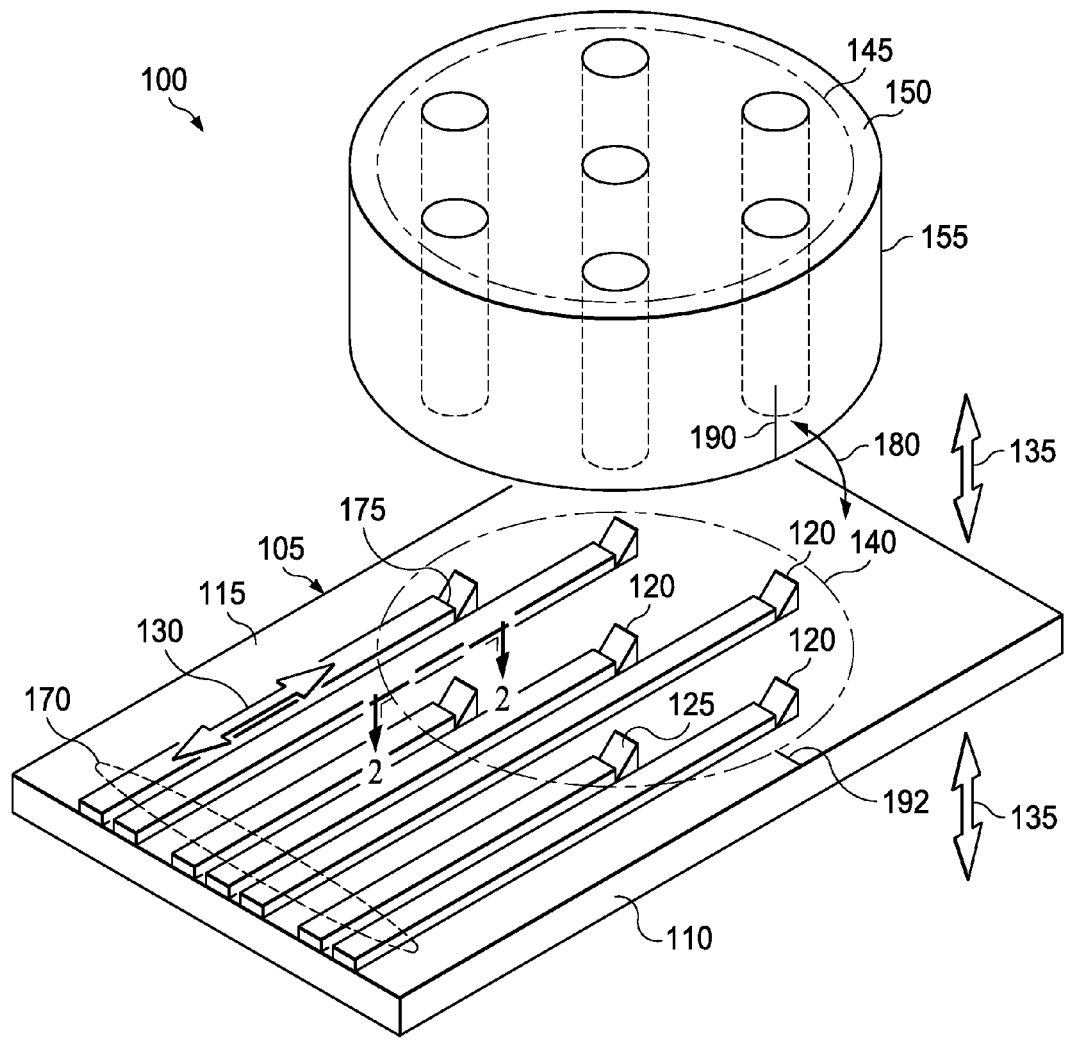
FIG. 1A presents a three-dimensional view of an optical device that includes an embodiment of a multi-core optical fiber coupler.

One embodiment is an optical device. FIG. 1A presents a three-dimensional view of such an optical device 100 that includes a multi-core optical fiber coupler. In some cases, for example, the optical device is, or includes, a planar photonic integrated circuit.

As illustrated in FIG. 1A the device 100 comprises a multi-core optical fiber coupler 105. The coupler 105, includes a substrate 110 having a planar surface 115 and turning mirrors 120. The turning mirrors 120 are located on the planar surface 115. Each of the turning mirrors 120 have a reflective surface 125 that is capable of changing a direction of light between a direction 130 that is parallel to the planar surface 115 and a direction 135 that is substantially non-parallel to the planar surface 115. The turning mirrors 120 form a pattern 140 on the planar surface 115. The pattern 140 is configured to match a pattern 145 of optical cores 150 in a multi-core optical fiber 155 positioned substantially normal to the planar surface 115 of the substrate 110. For example, the diameter of the pattern 145 is typically equal to of smaller than the diameter of a multi-core optical fiber.

In some embodiments, the non-parallel direction 135 is substantially normal to, e.g., ±20 degrees from the normal to the planar surface 115 or ±10 degrees from the normal. In some embodiments, the direction 135 is directed away from the substrate 115, while in other embodiments, the non-parallel direction 135 is substantially normal to the planar surface 115, i.e., as described above, and directed into the substrate 110. In cases where the turning mirrors 120 reflects light or receives light from outside the substrate 135, the substrate 120, the multi-core optical fiber 155 so that its near end portion is facing and substantially normal to the planar surface 115. For example, the near end segment of the multi-core optical fiber 155 may be aligned to the normal within ±20 degrees or preferably ±10 degrees. In cases where the turning mirrors 120 reflect light through, or receive light from, the substrate 120, the multi-core optical fiber 155 can be positioned substantially normal to the planar surface 115, e.g., anti-aligned to the normal within ±20 degrees or preferably ±10 degrees, and below the substrate 110.

Figure 1C:
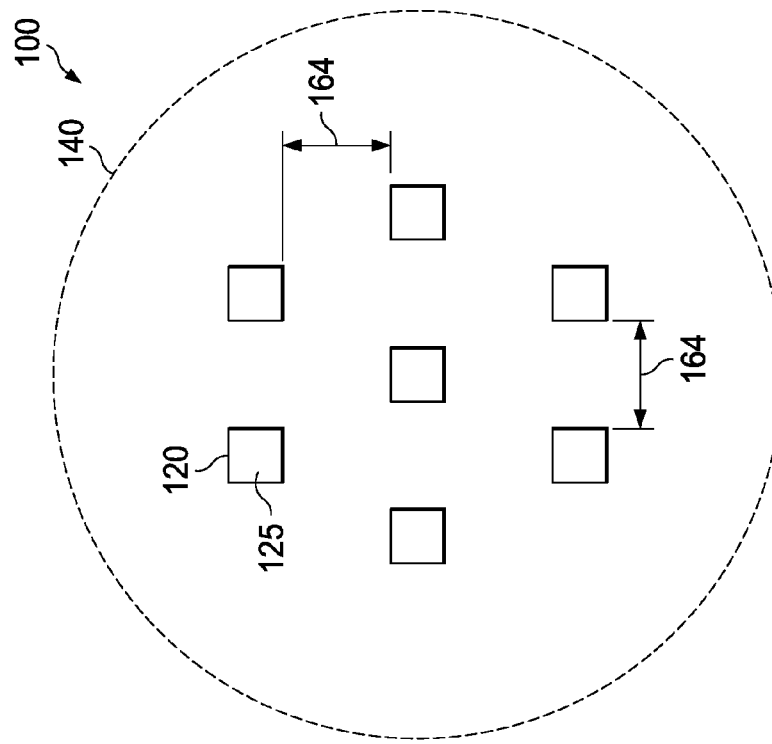
FIGS. 1B and 1C present plan views of example patterns of turning mirrors, e.g., for use in the various embodiments described herein.
Figure 1B:
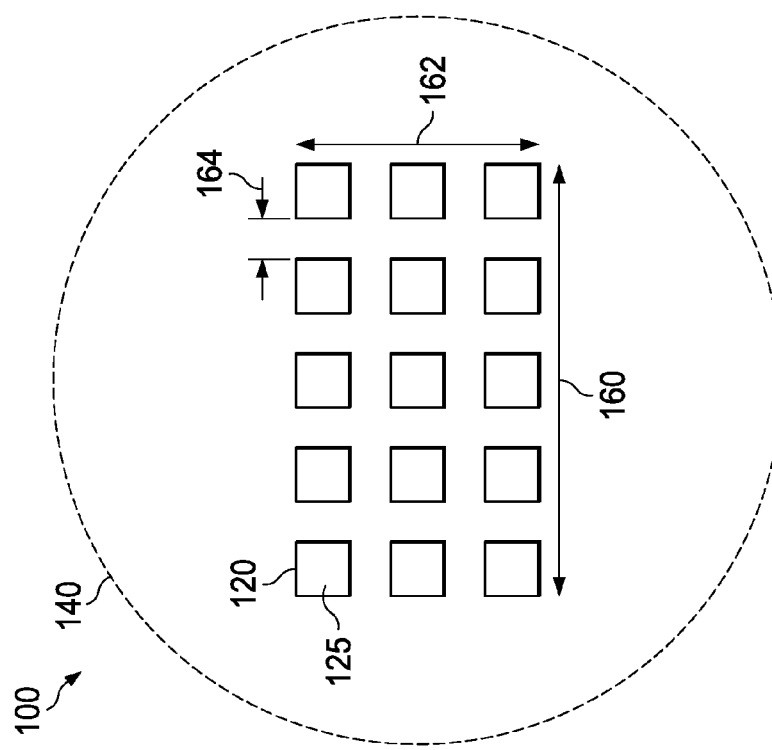

FIGS. 1B and 1C present plan views of example patterns 140 of turning mirrors 120 which can be a two-dimensional pattern. However, in other embodiments, the pattern 140 could be a one-dimensional pattern. In some embodiments, as illustrated in FIG. 1B, the two-dimensional pattern 140 formed by the turning mirrors 120 is a grid of the turning mirrors 120 orientated along two perpendicular axes 160, 162 that are parallel to the planar surface 115. In other embodiments, as illustrated in FIG. 1, the two-dimensional pattern 140 formed by the turning mirrors 120 is a hexagonal pattern of the turning mirrors 120 with one central turning mirror 120. Based on the present disclosure, one skilled in the art would appreciate how the pattern 140 of turning mirrors could be configured to substantially match the lateral pattern 145 of cores 150 in the multi-core optical fiber 155, e.g., approximately matching in shape and/or laterally dimensions.

In some cases, it is desirable for the pattern 140 formed by the turning mirrors 120 to include adjacent pairs of the turning mirrors 120 that are spaced apart by a same distance 164. The distance 164, of course, is related to the distribution 145 of the cores 150 in the multi-core fiber 155, which in some cases are spaced apart by approximately this same distance 164 in order to prevent mixing of optical beams traveling into the different cores.

Figure 2:
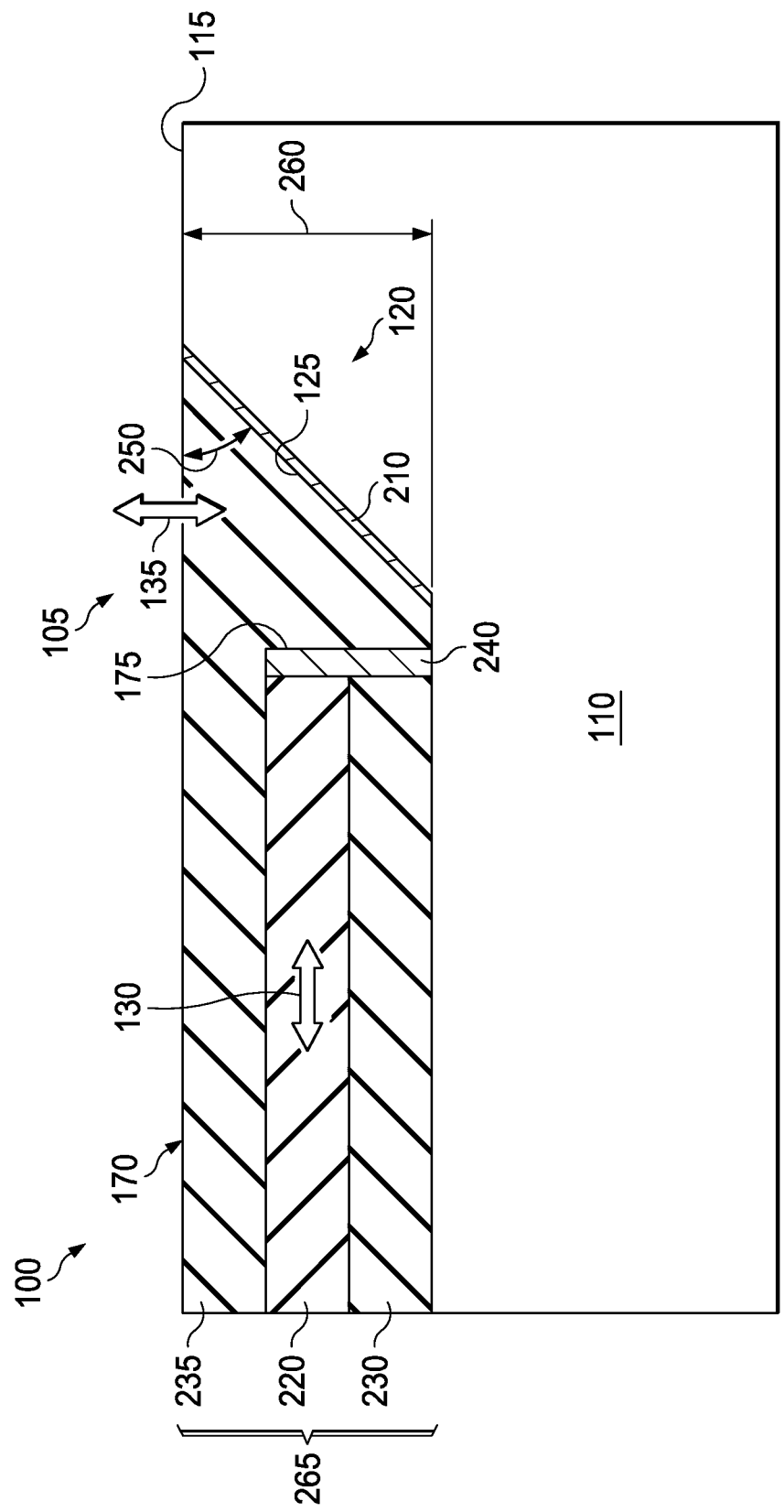
FIG. 2 presents a cross-sectional view of a portion of the embodiment presented in FIG. 1 along view line 2-2.
Figure 3:
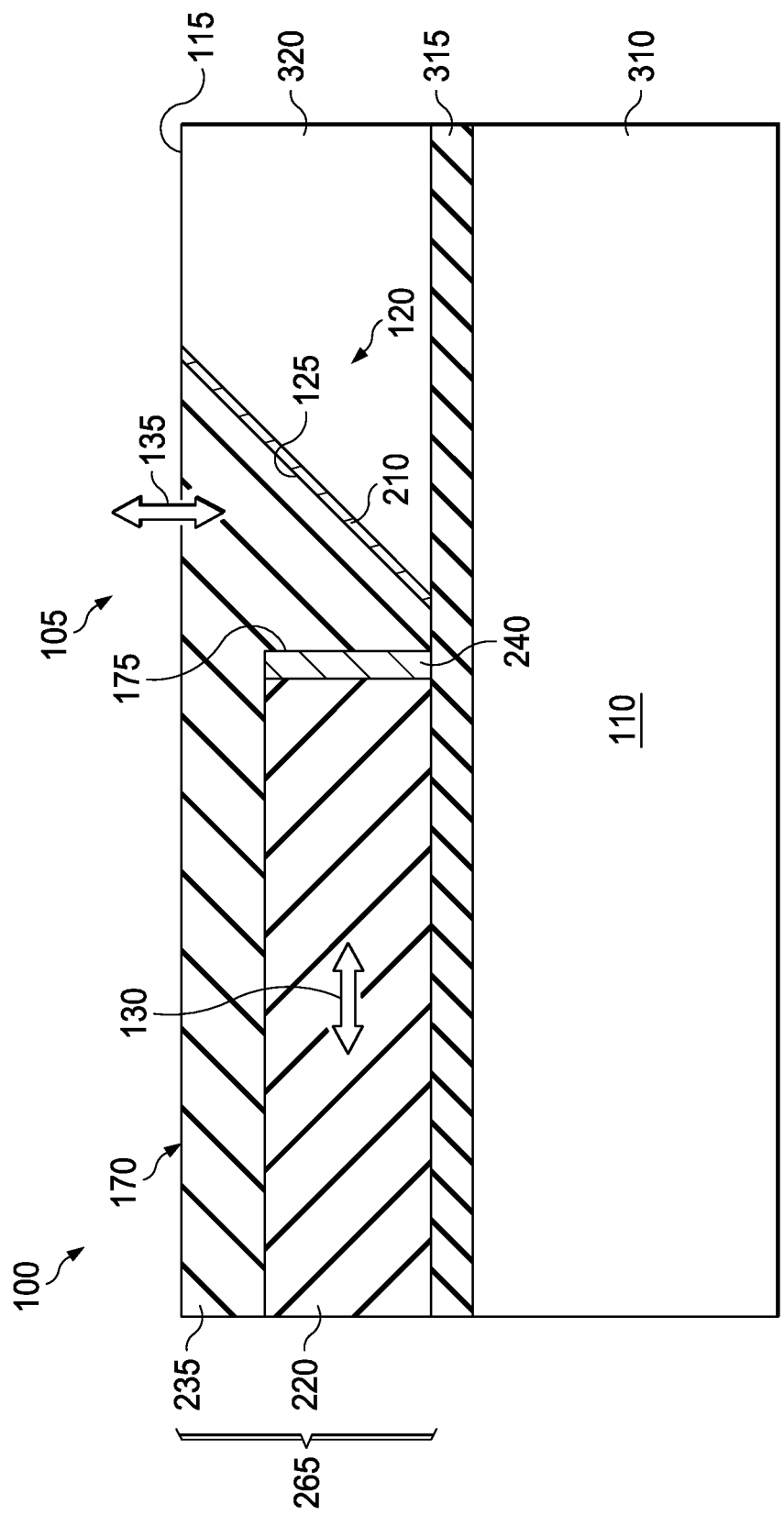
FIG. 3 presents a cross-sectional view of an alternative embodiment of an optical device, analogous to the cross-sectional view presented in FIG. 2.

FIG. 2 presents a cross-sectional view of a portion of the optical device 100 presented in FIG. 1A, along view line 2-2 in FIG. 1A. FIG. 3 presents a cross-sectional view of an alternative optical device of the disclosure, analogous to the cross-sectional view presented in FIG. 2.

In some embodiments, the turning mirrors 120 are a continuous part of a material layer of the substrate 110. In some cases, as illustrated in FIG. 2, the substrate 110 can be a continuous crystalline material layer (e.g., silicon or indium phosphate) and the turning mirrors 120 are a continuous part of that material layer. In some cases, as illustrated in FIG. 3 the substrate 110 can comprise a plurality of material layers 310, 315, 320. For instance, in some cases the substrate 110, configured as a silicon-on-insulator (SOI) substrate, includes a lower base layer 310 (e.g., a silicon base layer), a middle layer 315 (e.g., a middle silicon oxide layer) and upper layer 320 (e.g., a silicon device layer). In such embodiments, the turning mirrors 120 can be a continuous part of the upper layer 320.

However, in other embodiments, the turning mirrors 120 can be formed from separate material pieces located on the substrate 110 or formed on a separate substrate and then transferred to the substrate 110.

As further illustrated in FIGS. 2 and 3, in some cases the reflective surface 125 includes a mirror-coating layer 210 to facilitate more efficient reflection of the light. For instance, the mirror-coating layer 210 can be composed of silver, gold or other similarly light reflecting material that are deposited on the reflective surface 125 or can be composed a plurality of materials such as silicon and silicon dioxide deposited to achieve a high reflection coating. However, in other embodiments, the reflective surface 125 can be formed from only the material layer of the mirror 120.

Returning to FIG. 1A, in some embodiments, the optical device 100 can further include a plurality of waveguides 170. One end 175 of each of the waveguides 170 has an end that physically faces and is, thus, directly optically coupled to the reflective surface 125 of a distinct one of the turning mirrors 120. One of ordinary skill in the art would understand that to improve the transfer of light between the waveguide and mirror 120, it is desirable to place the facing end 175 in close proximity (e.g., about 20 microns or less is some cases) to the reflective surface 125.

In some embodiments, the waveguides 170 can be located on a different second substrate and the different second substrate and the substrate 110 can be located near each other such that each nearby end 175 of an individual one of the waveguides 170 on the different second substrate is physically facing and nearby to the reflective surface 125 of a distinct one of the mirrors 120.

In some cases, the waveguides 170 are configured as planar waveguides (e.g., integrated planar waveguide in some cases). For instance, as illustrated in FIGS. 2 and 3 each waveguide 170 can have a planar optical core layer 220. In some cases, the planar waveguide core 220 is located between a bottom planar optical cladding layer 230 and a top planar optical cladding layer 235. In some cases, e.g., when the substrate 110 is a SOI substrate, a middle silicon oxide layer 315 (FIG. 3) can be the bottom cladding layer and a patterned portion the silicon device layer 320 can form the core layer 220.

In some cases, as further illustrated in FIGS. 2 and 3, to improve the efficiency of light transfer and reduce unwanted back reflection, the end 175 of the planar waveguide 170 that is coupled to the mirror 120 can be coated with an antireflective coating layer 240 composed of a material such as silicon nitride and titanium dioxide or similar material having an index of refraction that is between that of air (or a surrounding cladding layer 235) and the core 220.

Figure 4:
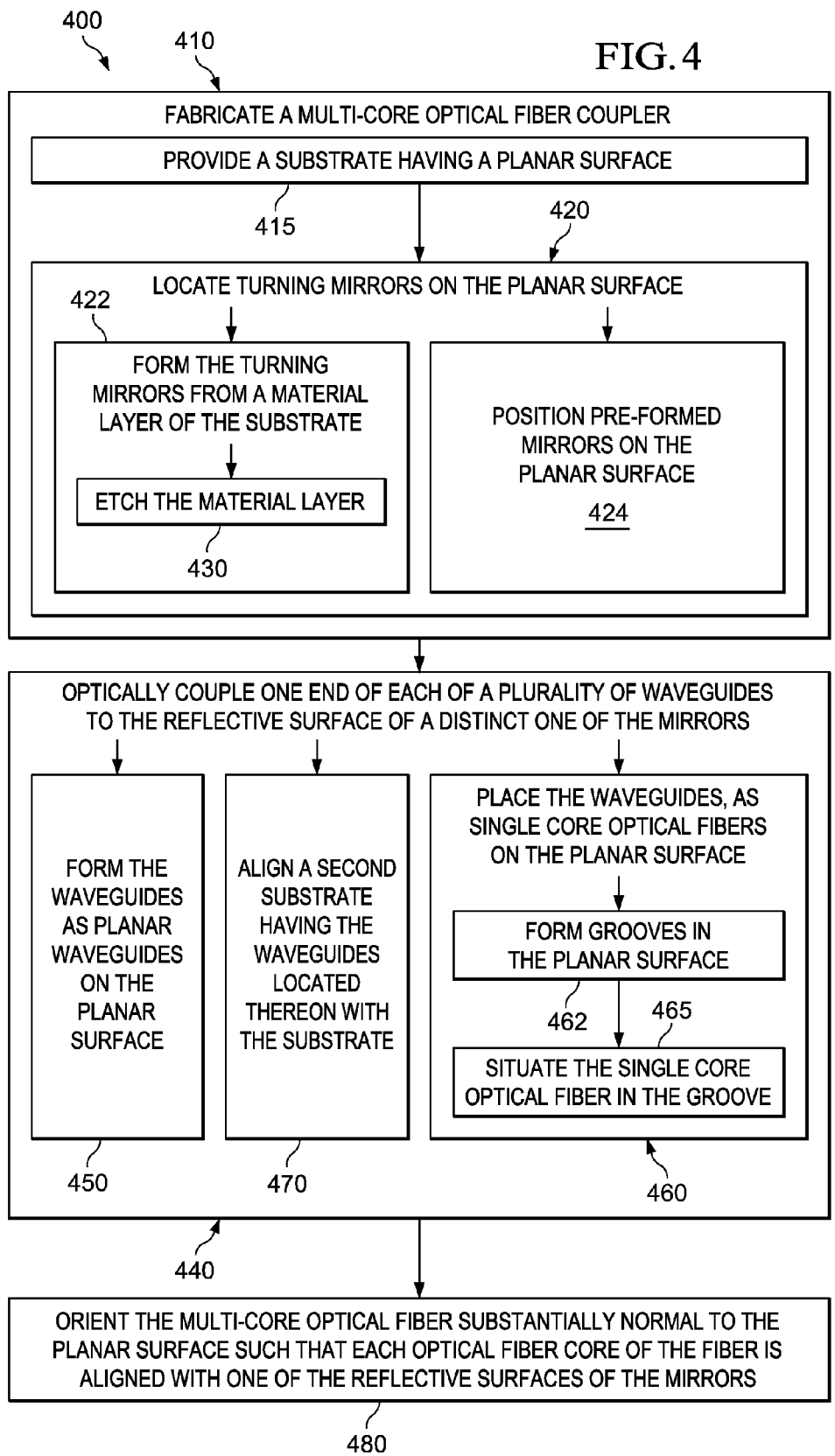
FIG. 4 presents a flow diagram illustrating an example method for manufacturing an optical device, including the manufacture of multi-core optical fiber couplers such as any of the multi-core optical fiber couplers discussed in the context of FIGS. 1A-3.

Another embodiment of the disclosure is a method of manufacturing an optical device. FIG. 4 presents a flow diagram illustrating an example method 400 for making the optical device of the disclosure, such as any of the devices 100 discussed in the context of FIGS. 1A-4.

With continuing reference to FIGS. 1A-3, the method 400 shown in FIG. 4 comprises a step 410 of fabricating a multi-core optical fiber coupler 105.

Fabricating the coupler 105 in step 410 includes a step 415 of providing a substrate 110 having a planar surface 115, and a step 420 of locating turning mirrors 120 on the planar surface 115 of the substrate 110, each of the turning mirrors 120 having a reflective surface 125 that is capable of changing a direction of light between a direction 130 that is parallel to the planar surface and a direction 135 that is non-parallel to the planar surface. For example, the direction 135 may be aligned or anti-aligned to a normal to the planar surface 115 by ±20 degrees. The turning mirrors 120 form a pattern 140 on the planar surface 115, the pattern 140 configured to match a pattern 145 of optical cores 150 in a multi-core optical fiber 155 positioned substantially normal to the planar surface 115 of the substrate 110. The matching may involve approximate matching of the shape of the pattern 145 to the shape of the lateral pattern of the optical cores 150 in the multi-core optical fiber 155 and/or may involve approximate matching of the distances between the turning mirrors 120 to corresponding lateral distances between the optical cores 150.

In some embodiments locating turning mirrors 120 on the planar surface 115 in step 420 includes a step 422 forming the turning mirrors from a material layer of the substrate (e.g., from an silicon layer 320 or from the bulk substrate 110 itself) or other material layer deposited on the substrate (e.g., silicon dioxide or polymer). In other cases, however, locating turning mirrors 120 in step 420 can include a step 424 of positioning pre-formed mirrors 120 on the planar surface 115. For instance, the mirrors 120 can be located on the planar surface with the aid of micromanipulators and then an adhesive material can be used to fix the mirrors 120 to the surface 115.

In some cases, the step 422 of forming the turning mirrors from a material layer includes a step 430 of etching the material layer. In some embodiments, e.g., the etching of the sloped surface 125 can be done through dry etch with masks (for instance, grayscale photolithography and etch). In some embodiments, the planar surface 115 of the material layer has a particular crystal orientation that is conducive to forming the reflective surface 125 so as to form a non-zero angle 250 (FIG. 2) relative to the planar surface 115, e.g., with non-isotropic wet etch.

For instance, some embodiments of step 430 include performing a wet or vapor potassium hydroxide etch of the (100) oriented crystalline surface 115 of a silicon layer (e.g., the silicon layer 320 or from a bulk substrate 110 of silicon) to form a reflective surface 125 on the (111) plane having an angle 250 of about 54.7 degrees relative to the planar surface 115. In other embodiments, a similar etch can be performed to obtain a reflective surface 125 on the (110) plane having an angle 250 of about 45 degrees relative to the planar surface 115. One of ordinary skill in the art would understand how to prepare different planar surfaces 115 with different crystal orientations (e.g., by making off-axis cuts of a silicon substrate) so that etching the surface 115 results in a different angle 250, as desired.

In some cases the step 430 of etching the material layer is a timed etch, wherein after set period of time the etchant is removed, and from previous trials, a desired target thickness 260 (FIG. 2) of the material layer (e.g., about 4 microns or greater in some cases) is removed by the etchant. In other cases, the substrate can include an etch-stop layer located below the material layer. For instance, consider some embodiments where the substrate 110 includes a silicon oxide layer 315 and silicon layer 330 thereon (FIG. 3). The silicon oxide layer 315 can be the etch-stop layer and the reflective surface is formed by etching the material layer 320.

Some embodiments of the method 400 can further include a step 440 of optically coupling one end 175 of each of a plurality of waveguides 170 to the reflective surface 125 of a distinct one of the turning mirrors 120.

In some cases, optically coupling the waveguide 170 to the reflective surfaces 125 in step 440 includes a step 450 of forming the waveguides 170, configured as planar waveguides, on the planar surface 115. For instance, forming the waveguides 170 (step 450) can include patterning the planar surface to form openings 265 in the substrate 110 to thereby define planar waveguide cores 220 located on a lower cladding layer 230 such that one end 175 of the each of the core layers 220 faces one of the reflective surface 125 of one of the mirrors 120. One skilled in the art would be familiar with the steps involved in pattern a substrate e.g., using photolithography to define a mask layer and then etching areas of the substrate 110 not covered by the mask layer.

In some embodiments, the step 430 of etching the material layer to form the reflective surface 125 can also form the openings 265, while in other embodiments a separate etching process can be used as part of the patterning step 430. In some cases, it is advantageous to perform the patterning step 450 on a substrate 110 that has an etch-stop layer (e.g., a silicon oxide layer 315, FIG. 3) because this can facilitate forming a core layer 220 having smooth surfaces on the substrate 110. In some embodiments, forming the waveguides 170 in step 450 can further include covering the planar waveguide cores layers 220 with an upper cladding layer 235 (e.g., via chemical vapor deposition of a silicon oxide layer 235 on the core layers 220, followed by a chemical mechanic polishing to planarize the deposited surface).

In still other cases, optically coupling the waveguide 170 to the reflective surfaces 125 in step 440 includes a step 470 of aligning a second substrate having the plurality of waveguides 170 located thereon with the substrate 110 such the waveguides 170 are optically coupled to the distinct ones of the reflective surfaces 125 of the turning mirrors 120. In some cases the optically coupling further includes aligning a second substrate having the plurality of waveguides located thereon with the substrate such that each of the waveguides has an end facing and optically coupled to a corresponding adjacent one of the turning mirrors.

Some embodiments of the method 400 can further include a step 480 of orienting the multi-core optical fiber 155 substantially normal (e.g., 90 degrees±10 degrees) to the planar surface 115 such that each optical fiber core 150 of the fiber 155 is aligned with one of the reflective surfaces 125 of the mirrors 120.

In some embodiments, it can be advantageous for the optical fiber 155 to be tilted slightly away from a normal angle 180 to the planar surface 115 (e.g. 88 to 80 degrees or 92 to 100 degrees) to reduce the back reflections at the fiber interface. Therefore, it might be desirable to have the angle of the reflective surface 125 formed so as have an angle 250 that is slightly different from a one-half-normal angle of about 45 degrees.

In some cases it is advantageous to provide alignment marks 190 on the other surface of the fiber 155 and marks 192 on the planar surface 115 to facilitate aligning the optical cores 150 with the mirrors 120.

Although the present invention has been described in detail, those skilled in the art should understand that they can make various changes, substitutions and alterations herein without departing from the scope of the invention.

What is claimed is:

1. An optical device, comprising:
   a multi-core optical fiber coupler, including:
     a substrate having a continuous crystalline material layer with a planar surface; and
     turning mirrors located along the planar surface, each of the turning mirrors having a reflective surface that is diagonally angled relative to the planar surface, and, wherein the reflective surface is oriented to change a direction of light between a direction that is parallel to the planar surface and a direction that is substantially non-parallel to the planar surface, wherein:
       the turning mirrors form a lateral pattern along the planar surface, the lateral pattern being configured to approximately match a pattern of optical cores in a multi-core optical fiber whose end segment faces the pattern and is positioned substantially normal to the planar surface of the substrate.

2. The optical device of claim 1, wherein the non-parallel direction is parallel to a normal to the planar surface to within 20 degrees and is directed away from the substrate.

3. The optical device of claim 1, wherein the non-parallel direction is parallel to a normal to planar surface to within 20 degrees and is directed into the substrate.

4. The optical device of claim 1, wherein the pattern formed by the turning mirrors is a grid or hexagonal pattern of the turning mirrors orientated along two perpendicular axes that are parallel to the planar surface.

5. The optical device of claim 1, wherein the pattern formed by the turning mirrors includes adjacent pairs of the turning mirrors that are spaced apart by about a same distance.

6. The optical device of claim 1, wherein the planar surface of the material layer has a (100) oriented crystalline surface or a (111) oriented crystalline surface.

7. The optical device of claim 1, wherein each reflective surface includes a reflective mirror-coating layer.

8. The device of claim 1, further including a plurality of waveguides, wherein one end of each of the waveguides faces and is adjacent to the reflective surface of a corresponding one of the turning mirrors.

9. The device of claim 8, wherein the plurality of waveguides are located on the planar surface of the substrate.

10. The optical device of claim 8, wherein each of the waveguides has a corresponding planar optical core.

11. A method, comprising:
    fabricating a multi-core optical fiber coupler, including:
      providing a substrate having a continuous crystalline material layer with a planar surface;
      locating turning mirrors on the planar surface, each of the turning mirrors having a reflective surface that is diagonally angled relative to the planar surface, and, wherein the reflective surface and oriented to change a direction of light between a direction that is parallel to the planar surface and a direction that is substantially normal to the planar surface, wherein:
        the turning mirrors form a pattern along the planar surface, the pattern configured to match a lateral pattern of optical cores in a multi-core optical fiber having an end facing the pattern of the turning mirrors and having a near by end segment oriented substantially normal to the planar surface of the substrate.

12. The method of claim 11, wherein locating the turning mirrors including forming the turning mirrors includes etching a (100) oriented crystalline surface or a (111) oriented crystalline surface of the planar surface of the material layer.

13. The method of claim 12, wherein the etching of the material layer includes a wet or vapor hydroxide etch of the planar surface.

14. A method, comprising:
    fabricating a multi-core optical fiber coupler, including:
      providing a substrate having a planar surface;
      locating turning mirrors on the planar surface, each of the turning mirrors having a reflective surface that is capable of changing a direction of light between a direction that is parallel to the planar surface and a direction that is substantially normal to the planar surface, wherein:
        the turning mirrors form a pattern along the planar surface, the pattern configured to match a lateral pattern of optical cores in a multi-core optical fiber having an end facing the pattern of the turning mirrors and having a near by end segment oriented substantially normal to the planar surface of the substrate and wherein:
      locating the turning mirrors including forming the turning mirrors from a material layer of the substrate,
      forming the turning mirrors from the material layer includes etching the material layer, and
      the etching stops at an etch-stop layer of the substrate that is located below the material layer.

15. The method of claim 11, further including optically coupling one end of each of a plurality of waveguides to the reflective surface of a distinct one of the turning mirrors, wherein the optically coupling further includes aligning a second substrate having the plurality of waveguides located thereon with the substrate such that each of the waveguides has an end facing and optically coupled to a corresponding adjacent one of the turning mirrors.

16. The method of claim 11, further including orienting the multi-core optical fiber substantially normal to the planar surface such that each optical fiber core of the multi-core optical fiber is aligned with one reflective surface of the mirrors.

17. An optical device, comprising:
    a multi-core optical fiber coupler, including:
      a substrate having a continuous crystalline material layer with a planar surface and an etch stop layer located below the material layer; and
      turning mirrors located along the planar surface, each of the turning mirrors having a reflective surface oriented to change a direction of light between a direction that is parallel to the planar surface and a direction that is substantially non-parallel to the planar surface, wherein:
        the turning mirrors form a lateral pattern along the planar surface, the lateral pattern being configured to approximately match a pattern of optical cores in a multi-core optical fiber whose end segment faces the pattern and is positioned substantially normal to the planar surface of the substrate; and
    a planar waveguide located on the substrate, wherein one end of the planar waveguide is oriented to face the reflective surface, and, a portion of the etch stop layer is a lower cladding layer of the planar waveguide.

18. The device of claim 17, wherein a portion of the material is a core layer of the planar waveguide.

* * * * *